United States Patent
Lee et al.

(10) Patent No.: US 10,892,801 B2
(45) Date of Patent: Jan. 12, 2021

(54) METHOD FOR SIGNALING FOR PHASE FEEDBACK, AND DEVICE FOR SAME

(71) Applicant: LG ELECTRONICS INC., Seoul (KR)

(72) Inventors: Kilbom Lee, Seoul (KR); Jiwon Kang, Seoul (KR)

(73) Assignee: LG Electronics Inc., Seoul (KR)

(*) Notice: Subject to any disclaimer, the term of this patent is extended or adjusted under 35 U.S.C. 154(b) by 46 days.

(21) Appl. No.: 16/324,673

(22) PCT Filed: Aug. 8, 2017

(86) PCT No.: PCT/KR2017/008553
§ 371 (c)(1),
(2) Date: Feb. 11, 2019

(87) PCT Pub. No.: WO2018/030752
PCT Pub. Date: Feb. 15, 2018

(65) Prior Publication Data
US 2019/0181921 A1    Jun. 13, 2019

Related U.S. Application Data

(60) Provisional application No. 62/373,987, filed on Aug. 12, 2016.

(51) Int. Cl.
*H04W 72/04* (2009.01)
*H04B 7/0408* (2017.01)
*H04B 7/06* (2006.01)

(52) U.S. Cl.
CPC ............ *H04B 7/0408* (2013.01); *H04B 7/06* (2013.01); *H04B 7/063* (2013.01); *H04B 7/0689* (2013.01); *H04W 72/042* (2013.01)

(58) Field of Classification Search
CPC ........ H04B 7/0408; H04B 7/06; H04B 7/063; H04B 7/0689; H04W 72/042
USPC .......................................................... 370/328
See application file for complete search history.

(56) References Cited

U.S. PATENT DOCUMENTS

| | | | |
|---|---|---|---|
| 10,224,993 B2* | 3/2019 | Kim .................. | H04B 7/10 |
| 2008/0051150 A1* | 2/2008 | Tsutsui ................ | H04B 7/0639 |
| | | | 455/562.1 |
| 2010/0046667 A1* | 2/2010 | Tsutsui ................ | H01Q 1/246 |
| | | | 375/296 |
| 2012/0027113 A1* | 2/2012 | Gaal .................. | H04B 7/0456 |
| | | | 375/267 |
| 2013/0194943 A1* | 8/2013 | Davydov ............. | H04W 72/04 |
| | | | 370/252 |
| 2014/0126398 A1 | 5/2014 | Kim et al. | |
| 2014/0146778 A1* | 5/2014 | Wang .................. | H04L 1/0026 |
| | | | 370/329 |

(Continued)

FOREIGN PATENT DOCUMENTS

| KR | 1020080047111 A | 5/2008 |
|---|---|---|
| KR | 1020100083534 A | 7/2010 |

*Primary Examiner* — Robert J Lopata
(74) *Attorney, Agent, or Firm* — Dentons US LLP

(57) ABSTRACT

A method for a terminal receiving signaling for a phase feedback can comprise the steps of: receiving, from a base station, control information including first information indicating whether the terminal must perform the phase feedback for a plurality of beams; and determining whether to perform the phase feedback on the basis of the control information.

17 Claims, 10 Drawing Sheets

(56) References Cited

U.S. PATENT DOCUMENTS

| | | | |
|---|---|---|---|
| 2014/0355719 A1 | 12/2014 | Wang et al. | |
| 2015/0003365 A1* | 1/2015 | Seo | H04L 5/0053 |
| | | | 370/329 |
| 2015/0055496 A1* | 2/2015 | Zhao | H04L 5/0035 |
| | | | 370/252 |
| 2015/0280802 A1* | 10/2015 | Thomas | H04L 27/2636 |
| | | | 370/312 |
| 2017/0302352 A1* | 10/2017 | Islam | H04L 5/0048 |
| 2018/0053997 A1* | 2/2018 | Noto | H04B 1/04 |
| 2018/0331746 A1* | 11/2018 | Okuyama | H04W 72/0426 |
| 2019/0181934 A1* | 6/2019 | Kang | H04W 72/082 |
| 2019/0273537 A1* | 9/2019 | Rahman | H04L 1/0023 |

* cited by examiner

METHOD FOR SIGNALING FOR PHASE FEEDBACK, AND DEVICE FOR SAME

This application is the National Phase of PCT International Application No. PCT/KR2017/008553, filed on 8 Aug. 2017, which claims priority under 35 U.S.C. 119(e) to U.S. Provisional Application No. 62/373,987 filed on 12 Aug. 2016 which is hereby incorporated by reference herein in their entirety.

TECHNICAL FIELD

The present invention relates to wireless communication, and more particularly, to a method for signaling for a phase feedback and a device for the same.

BACKGROUND ART

In a next generation 5G system, scenarios can be classified by enhanced Mobile BroadBand (eMBB), ultra-reliable Machine-Type Communications (uMTC), massive Machine-Type Communications (mMTC), and the like. The eMBB corresponds to a next generation mobile communication scenario having characteristics such as high spectrum efficiency, high user experienced data rate, high peak data rate, and the like. The uMTC corresponds to a next generation mobile communication scenario having characteristics such as ultra-reliable, ultra-low latency, ultra-high availability, and the like (e.g., V2X, emergency service, remote control). The mMTC corresponds to a next generation mobile communication scenario (e.g., IoT) having characteristics such as low cost, low energy, short packet, and massive connectivity.

DISCLOSURE

Technical Problem

An object of the present invention is to provide a method for a user equipment (UE) for receiving signaling for a phase feedback.

Another object of the present invention is to provide a user equipment (UE) for receiving signaling for a phase feedback.

Still another object of the present invention is to provide a method for a base station for receiving signaling for a phase feedback.

Further still another object of the present invention is to provide a base station for receiving signaling for a phase feedback.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve one object of the present invention, a method for a UE receiving a signaling for a phase feedback may comprise the steps of receiving, from a base station, control information including first information indicating whether the UE should perform the phase feedback for a plurality of beams; and determining whether to perform the phase feedback on the basis of the control information.

The method may further comprise the step of indicating that the phase feedback should not be performed if the first information is greater than a threshold value previously defined for a phase distortion level between antenna groups of the base station. The method may further comprise the step of indicating that the phase feedback should be performed if the first information is less than a threshold value previously defined for a phase distortion level between antenna groups of the base station.

The control information may further include second information indicating a precoder scheme which will be applied during downlink reception of the UE if the first information indicates that the phase feedback should not be performed.

The control information may further include information on the number of bits which will be used for the phase feedback. The method may further comprise the step of determining a level of phase information for the phase feedback on the basis of the number of bits which will be used for the phase feedback.

To achieve another object of the present invention, a UE receiving a signaling for a phase feedback may comprise a receiver configured to receive, from a base station, control information including first information indicating whether the UE should perform the phase feedback for a plurality of beams; and a processor configured to determine whether to perform the phase feedback on the basis of the control information.

The UE may indicate that the phase feedback should not be performed if the first information is greater than a threshold value previously defined for a phase distortion level between antenna groups of the base station. In this case, the UE may further comprise a receiver configured to receive a downlink channel subjected to beam cycling in a unit of a resource element (RE) or resource block (RB) from the base station. The control information may further include second information for a phase information feedback of the UE if the first information indicates that the phase feedback should be performed. The UE may further comprise a transmitter configured to transmit information on a phase feedback on the basis of the control information if the first information indicates that the phase feedback should be performed.

The control information may further include second information indicating a precoder scheme which will be applied during downlink reception of the UE if the first information indicates that the phase feedback should not be performed. The control information may further include information on the number of bits which will be used for the phase feedback, and the processor may be configured to determine a level of phase information for the phase feedback on the basis of the number of bits which will be used for the phase feedback.

To achieve still another object of the present invention, a method for a base station transmitting a signaling for a phase feedback may comprise the steps of transmitting, to a UE, control information including first information indicating whether the UE should perform the phase feedback for a plurality of beams; and transmitting, to the UE, a downlink channel subjected to beam cycling in a unit of a resource element (RE) or resource block (RB) if the first information indicates that the phase feedback should not be performed.

To achieve further still another object of the present invention, a base station transmitting a signaling for a phase feedback may comprise a transmitter; and a processor, wherein the processor controls the transmitter to transmit, to a UE, control information including first information indicating whether the UE should perform the phase feedback for a plurality of beams, and controls the transmitter to transmit, to the UE, a downlink channel subjected to beam cycling in a unit of a resource element (RE) or resource block (RB) if the first information indicates that the phase feedback should not be performed.

Advantageous Effects

According to one embodiment of the present invention, a magnitude/phase distortion problem between UE transmission antenna groups can be solved.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Also, in the following description, specific terminologies are provided to help the understanding of the present invention, and the use of the specific terminology can be modified into another form within the scope of the technical spirits of the present invention.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present invention, and the use of the specific terminology can be modified into another form within the scope of the technical spirits of the present invention.

Figure 1:
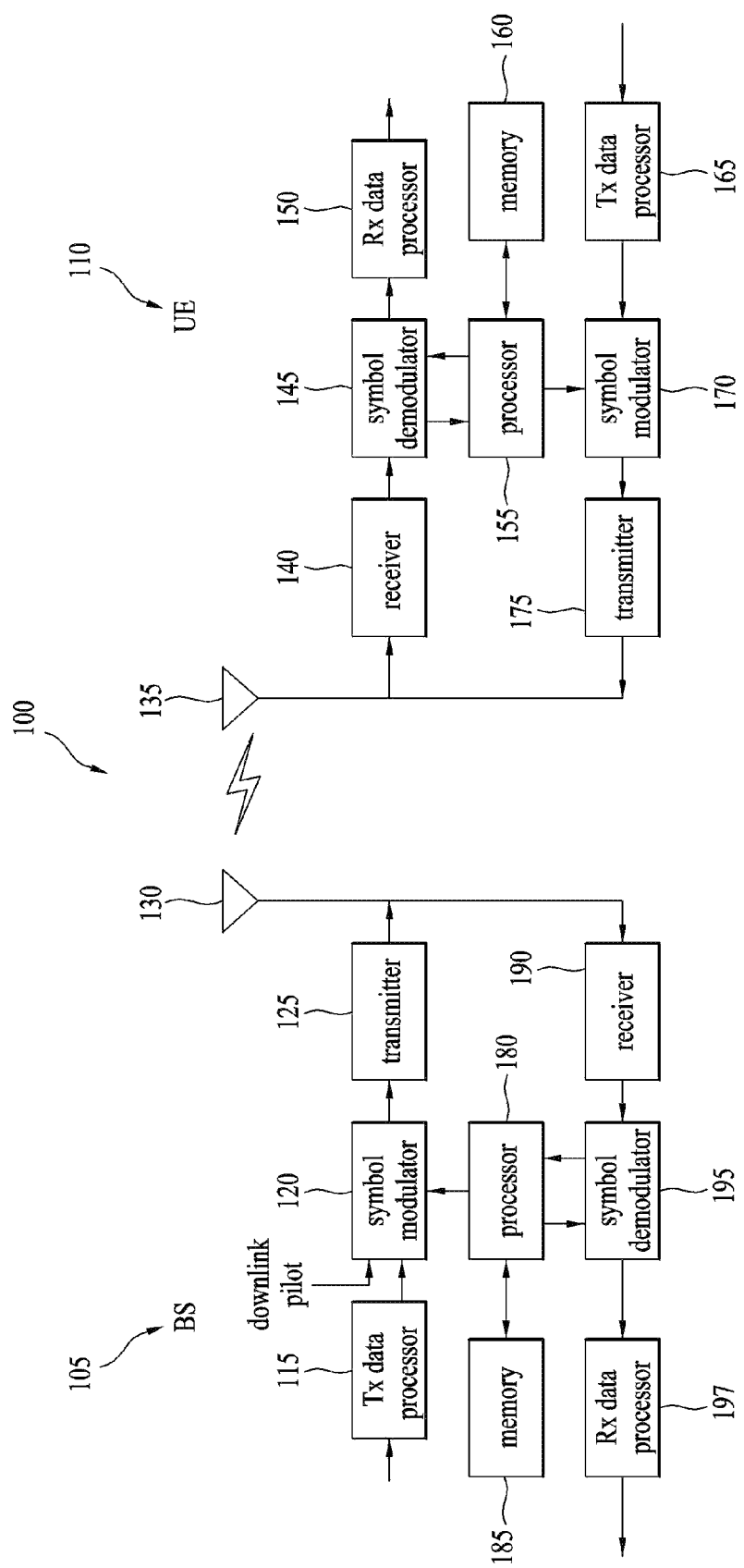
FIG. 1 is a block diagram illustrating configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data.

The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
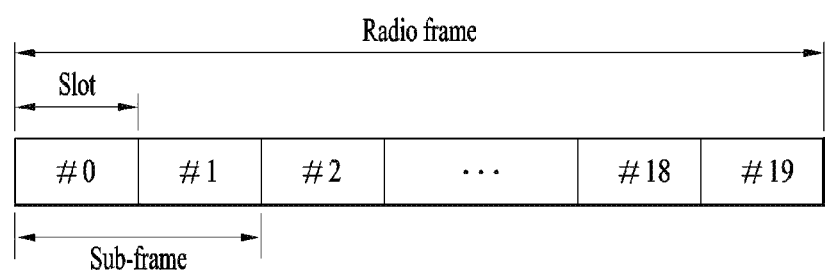
FIG. 2 is a diagram illustrating a frame structure of LTE/LTE-A system.

FIG. 2 is a diagram for LTE/LTE-A frame structure.

Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

One resource block (RB) is defined by 12 subcarriers and 7 OFDM symbols of an interval of 15 kHz. The base station transmits a primary synchronization signal (PSS), a secondary synchronization signal (SSS) and a physical broadcast channel (PBCH) for system information in 6 RBs of a center frequency. In this case, there may be a difference in a structure, signal and channel of the radio frame structure in accordance with normal/extended cyclic prefix (CP), and time division duplex (TDD)/frequency division duplex (FDD).

Figure 3:
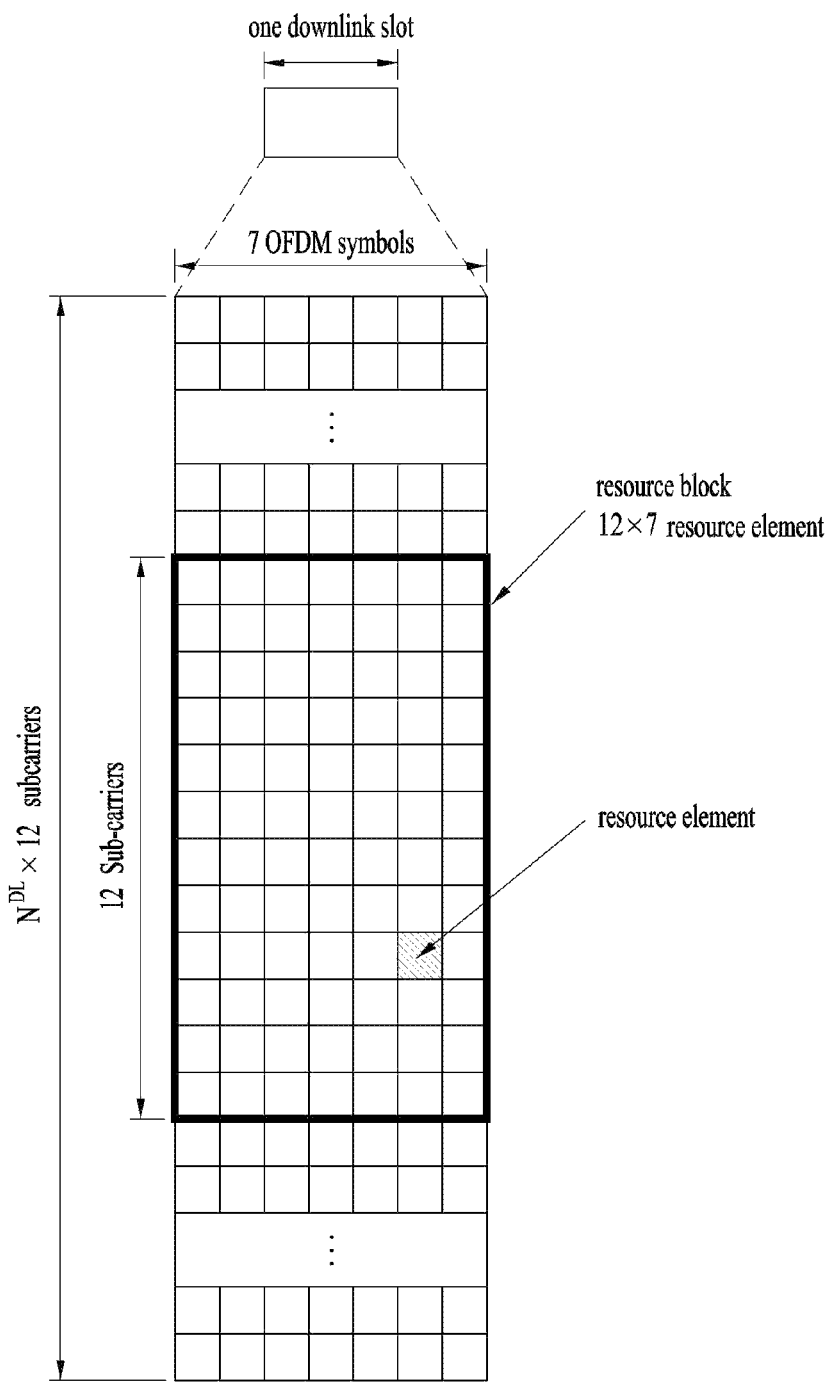
FIG. 3 is a diagram illustrating a resource grid of a downlink slot of 3GPP LTE/LTE-A system corresponding to one example of a wireless communication system.

FIG. 3 illustrates resource grid for one downlink slot in an exemplary 3GPP LTE/LTE-A system of a wireless communication system.

Referring to FIG. 3, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 4:
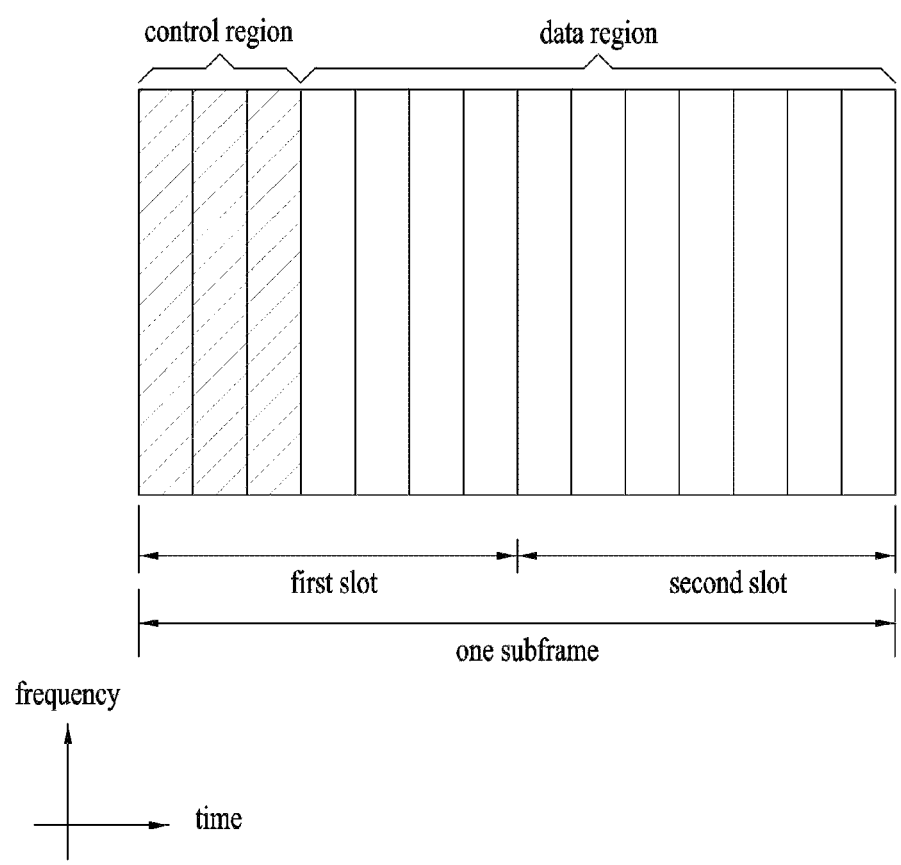
FIG. 4 is a diagram illustrating a structure of a downlink subframe of 3GPP LTE/LTE-A corresponding to one example of a wireless communication system.

FIG. 4 illustrates structure of downlink subframe of exemplary 3GPP LTE/LTE-A system of wireless communication system.

Referring to FIG. 4, a maximum of three or four OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI format selectively includes information of hopping flag, RB allocation, MCS (modulation coding scheme), RV (redundancy version), NDI (new data indicator), TPC (transmit power control), cyclic shift, DM RS (demodulation reference signal), CQI (channel quality information) request, HARQ process number, TPMI (transmitted precoding matrix indicator), PMI (precoding matrix indicator), confirmation, etc., according to usage.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
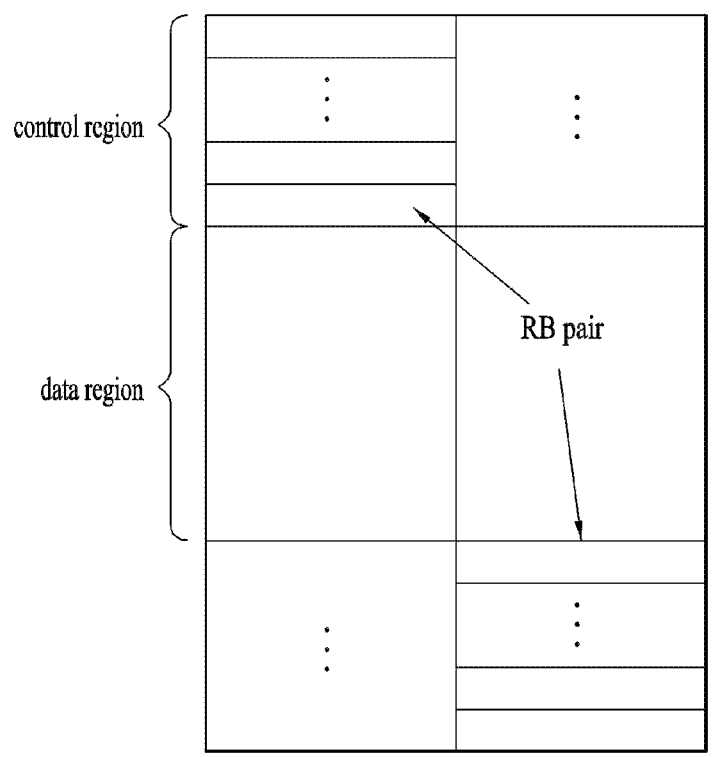
FIG. 5 is a diagram illustrating a structure of an uplink subframe of 3GPP LTE/LTE-A system corresponding to one example of a wireless communication system.
Figure 5:
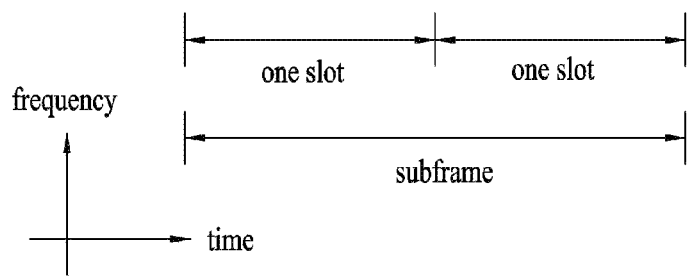

FIG. 5 illustrates structure of uplink subframe of exemplary 3GPP LTE.LTE-A of wireless communication system.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit ACK/NACK is transmitted as a response to a single downlink codeword and a 2-bit ACK/NACK is transmitted as a response to two downlink codewords.

Channel Quality Information (CQI): This is feedback information about a downlink channel. MIMO (Multiple Input Multiple Output)-related feedback information includes a rank indicator (RI), a precoding matrix indicator (PMI), and a precoding type indicator (PTI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Figure 6:
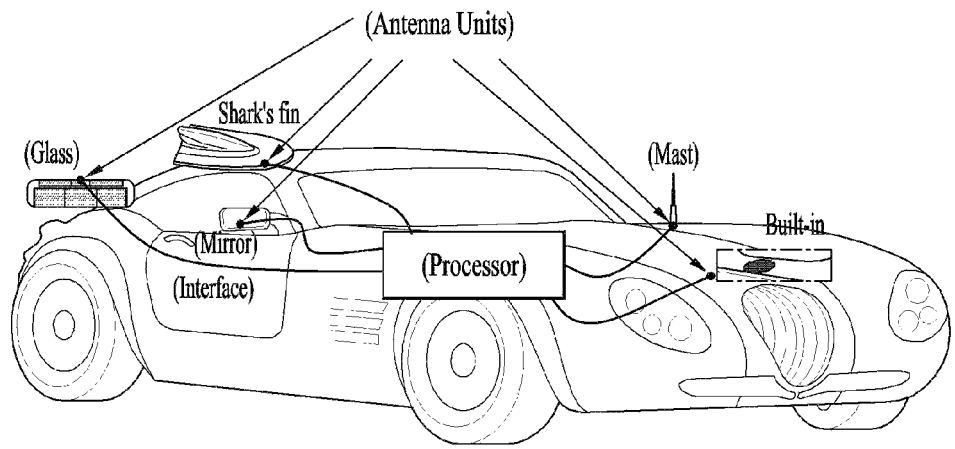
FIG. 6 is a diagram illustrating a UE multi-antenna array of a distributed type.

FIG. 6 is a diagram illustrating a UE multi-antenna array of a distributed type.

The current cellular system has evolved from fourth generation (4G) to 5G. The 5G communication systems have considered not only enhanced mobile broadband (eMBB) based on smartphones but also various IoT (Internet of Things) application services such as health care, disaster and safety management, vehicle communication, manufacturing plant control, robot control, etc., and UE types have also been diversified.

In addition, the 5G communication systems have considered use of ultra-high frequency bands including millimeter wave bands up to the maximum 100 GHz. Due to implementation of various types of UEs and use of the ultra-high frequency bands, tens or hundreds of antennas may be installed in a UE unlike the 4G system. For example, the vehicle may be implemented as one UE, and thus multiple antennas may be installed in one or a plurality of vehicles in a distributed manner.

Figure 7:
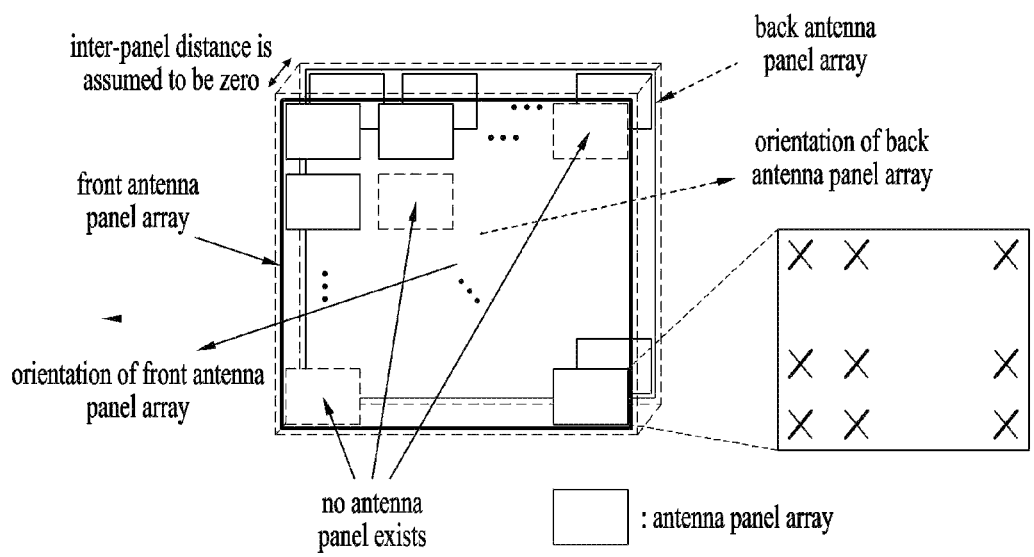
FIG. 7 is a diagram illustrating a plurality of antenna panel arrays installed in a UE.

As another example, in high frequency bands, multiple antenna panel arrays may be installed in a UE. FIG. 7 is a diagram illustrating a plurality of antenna panel arrays installed in a UE.

In this case, multiple antenna elements are uniformly distributed in an antenna panel array, but the antenna direction or interval between antenna panel arrays may not be uniform.

When a plurality of antenna arrays/panels with different directivity (or coverage) are installed in a UE as described above, it may be difficult to apply a codebook, which is designed on the assumption of a standard precoding scheme such as uniform linear/rectangular arrays as in the conventional uplink MIMO scheme. In addition, if a distance between each of the plurality of antenna arrays/panels and a baseband processor varies, a fixed phase difference may occur due to different delay. It may cause a situation that time synchronization between signals transmitted from different antenna units varies. Due to this situation, a base station (BS) may observe that the phases of signals transmitted from a specific UE antenna group are linearly distorted in proportion to subcarriers (when the OFDM system and different CP delay are assumed). Further, when a different oscillator is used for a signal transmitted from each antenna array/panel, the signal may be transmitted at slightly changed frequency due to an oscillator error, and this may cause a frequency synchronization error at the BS. Thus, the BS may observe decrease in the magnitude of the signals transmitted from the specific UE antenna group and noise increase due to phase distortion and inter-carrier interference (ICI).

The above-described problem related to magnitude/phase distortion between UE's transmission antenna groups may have different levels depending on UE implementation. For example, such a cabling issue may be solved at the implementation stage by designing the UE to perform a separate procedure for compensating for delay difference per antenna group. The oscillator issue may also be solved at the implementation stage by using a single oscillator or introducing a separate frequency compensation process. However, such a compensation process may require an additional processor or RF circuit, and thus it may increase the implementation complexity and cost of the UE.

Since the 5G UE includes a high-end UE with a high-cost processor for obtaining high quality data and a low-cost IoT UE as described above, it is preferable to support various levels of distortion. Therefore, the present invention proposes a method for uplink multi-antenna transmission adaptive to inter-APG (antenna port group) distortion vulnerability level, which varies per UE and relevant signaling procedures. For convenience of description, distortion vulnerability level is abbreviated as DVL.

Proposal 1: The UE reports the following information to the BS.

Case 1 [non-precoded SRS]: The UE reports port grouping information on uplink reference signal (RS) ports to the BS.

Case 2 [beamformed SRS]: The UE reports the number of uplink antenna arrays/panels/groups, RS port grouping information, or maximum RS ports per RS port group to the BS. In case 2, after receiving the corresponding information, the BS may indicate port grouping information while configuring the uplink RS transmission configuration for the corresponding UE.

Additionally, the UE may report DVL information between port groups to the BS.

In the following description, an uplink RS is assumed to be a sounding reference signal (or sounding reference symbol (SRS)) for convenience of description. When a total of M SRSs are grouped into a predetermined number of port groups, SRS port grouping information indicates the number of SRS ports included in each port group either implicitly or explicitly. The SRS port grouping information may correspond to antenna panel array configuration information or distributed antenna unit information of the UE. An example of the port group information is as follows.

Information on the number of SRS ports included in each group, $M_i$ (i=1, N) is indicated (where N indicates the number of port groups). For example, in case of M=5, $M_1$=3, $M_2$=2, and N=2, the information may indicate that SRS ports (indexes) {0,1,2} are included in the first group and SRS ports {3,4} are included in the second group.

The SRS port grouping information may be used to configure, determine, and indicate an uplink MIMO precoder (this will be described in detail in proposal 2). In addition, the SRS port grouping information may be used to estimate/correct uplink synchronization. For example, since each SRS port group may have different frequency/time synchronization characteristics, the BS may perform uplink synchronization correction based on only a specific SRS port group. Moreover, the SRS port grouping information may be used to estimate uplink channels.

If the BS estimates channels with respect to all SRS ports in such an environment, the BS may measure an increase in the jitter due to oscillator characteristics different from delay spread, which increases due to cable delay at the antenna port group level. Thus, depending on usage and channel parameters to be estimated, the measurement may need to be performed at the SRS port group level. Further, since large scaling fading (e.g., shadowing) may be different per each SRS port group, a quality value such as RSRP, RSRQ, CQI, etc. may be used to be measured per SRS port group. Finally, the BS may measure a phase/magnitude distortion value per uplink antenna array/panel/group or SRS port group and then inform the UE of the measured value so that the UE may perform pre-compensation and then report the information. For example, the BS may measure a phase shift value, which is linear to frequency, that occurs due to different cable delay per SRS port group and then inform the UE of the phase shift value per SRS port group.

Proposal 1-1: As a detailed proposal of the Proposal 1, the BS which has received the RS port grouping information may use it for at least one of uplink MIMO precoding configuration information, uplink synchronization estimation/correction, uplink channel estimation, and distortion compensation per RS port group.

If the RS port grouping information is used for compensating the distortion per RS port group, the BS may signal a magnitude/phase correction value per RS port group to the UE.

As an example of the DVL information between SRS port groups proposed in proposal 1, three stages of HIGH, MIDIUM, and LOW stages may be considered. Upon receiving this information, if DVL=HIGH, the BS may interpret the corresponding UE has severe phase distortion (e.g., low end UE). On the contrary, if DVL=LOW, the BS may interpret the corresponding UE has almost no phase distortion. Alternatively, depending on whether meaningful magnitude/phase distortion occurs, two stages: ON and OFF may be considered. Since the proposed DVL and/or SRS port grouping information is information on UE characteristics and it is not dynamically changed, it is preferable to transmit the information through a higher layer signaling (e.g., RRC signaling) message.

Proposal 2: The BS configures uplink MIMO precoder configuration information, which will be transmitted to the UE, and at this time, uplink MIMO precoding configuration information may include the following information of (1), (2) and (3).

(1) Partial precoder configuration information: PMI information to be used per SRS port group [in a non-precoded SRS case] or information on an SRS port index(es) [in a beamformed SRS case]

(2) Magnitude/phase coordination information between partial precoders (concatenating precoders):

In this case, the presence or absence and size of the information may be differentiated according to the UE's DVL or BS's indication. In addition, information on whether a concatenating precoder cycles and range information (e.g., precoder set information) may be included in the magnitude/phase coordination information. Further, transmit diversity or open-loop precoding among candidate concatenation precoding schemes may be included (e.g., D-CDD (large delay CDD) of the LTE system).

(3) Information on the number (rank) of simultaneously transmitted layers: This may be commonly indicated for all SRS ports.

According to the proposed method of the present invention, the BS basically indicates information on a precoder to be used per SRS port group but differentiates phase correction information between groups according to DVL. When an SRS port is transmitted from each independent transmission RF chain as in the LTE system, that is, in case of non-precoded SRS port transmission, MIMO precoder information to be used per SRS port group may contain an uplink precoding matrix indicator (PMI) and rank indicator (RI), which will be used by the UE. When beamforming is applied to an SRS port, that is, when one SRS port is transmitted from a plurality of transmission RF chains through beamforming to a specific precoder, the BS may indicate UE precoder information as SRS port index(es) information. In case of the beamformed SRS, a method for transmitting independent SRS ports by applying beamforming to each UE antenna group as described in the proposal 1 may be considered.

According to the present invention, a PMI or port selection information may be indicated for each SRS port group such that a partial precoder may be configured for each UE antenna groups with different radio channel and hardware characteristics. In this case, in case of the RI information, since a common RI should be applied to all SRS port groups, only a single value can be signaled from the BS to the UE. Moreover, in case of the beamformed SRS, the RI information may be dropped because it could be implicitly signaled by the number of ports per SRS group.

The UE may obtain partial precoder information from the above-described information (e.g., MIMO precoder information to be used per SRS port group). In other words, the UE may obtain information on the partial precoding matrix $W_i'$ with a size of M×r (where i=1, N and r=transmission rank). To determine the precoding matrix W with a size of M×r for all antennas (M=$\Sigma_{i=1}^{N} M_i$), the UE should perform a process for concatenating individual partial precoding matrices. In addition, to this end, the UE requires information for correcting magnitude and phase differences between the partial precoding matrices. Assuming that the magnitude and phase correction values for the jth layer of the ith partial precoder are $a_{i,j}$ and $\theta_{i,j}$, respectively, the corrected partial precoding matrix $W_i$ can be calculated as follows.

$$W_i = [a_{i,1}e^{j\theta_{i,1}}w_{i,1} \ldots a_{i,RI}e^{j\theta_{i,RI}}w_{i,RI}], \qquad \text{[Equation 1]}$$

where NW indicated precoder $$W_i' = [w_{i,1} \ldots w_{i,RI}]$$

Based on the above equation, the final precoding matrix can be calculated as follows.

$$W = \begin{bmatrix} W_1 \\ \vdots \\ W_N \end{bmatrix} \qquad \text{[Equation 2]}$$

For the same reason as that concatenating PMI (CPMI) information is required when a plurality of BSs participate in cooperative transmission, the magnitude/phase correction between partial precoders needs to be performed. The magnitude correction information may be indicated by the BS when each antenna group has different pathloss or shadowing characteristics. If the characteristics are similar, the information may be dropped. The magnitude/phase correction information may be differentiated depending on DVL. For example, in case of a UE with good DVL (UE of DVL=low), precise magnitude/phase correction information may be transmitted so that the UE may accurately concatenate partial precoding matrices. In case of a UE with poor DVL (UE of DVL=high), coarse correction information may be transmitted, or the corresponding information may be dropped.

Hereinafter, examples of differentiating downlink control information according to DVL will be described (DCI case 1 corresponds to non-precoded SRS transmission, and DCI case 2 corresponds to beamformed SRS transmission).

TABLE 1

If UE reported DVL=HIGH
DCI case 1: Uplink PMI per each SRS port group + RI
DCI case 2: SRS port index(es) per each SRS port group (+ RI)
- RI can be implicitly determined by the number of SRS ports and excluded in the feedback information.
If UE reported DVL=MID
DCI case 1: Uplink PMI per each SRS port group + RI + U bit resolution phase information($\theta_{i,j}'$, i=1,..., N−1, j=1,...,RI) for concatenation of port groups

TABLE 1-continued

DCI case 2: SRS port index(es) per each SRS port group (+ RI) + U bit resolution phase information($\theta_{i,j}'$, i=1,..., N−1, j=1,...,RI) for concatenation of port groups
- RI can be implicitly determined by the number of SRS ports and excluded in the feedback information.
If UE reported DVL=LOW
DCI case 1: Uplink PMI per each SRS port group + RI + V bit resolution phase information($\theta_{i,j}'$, i=1,..., N−1, j=1,...,RI) for concatenation of port groups v can be greater than or equal to U
- In this case, Uplink PMI for all SRS ports can be an alternative to above info.
DCI case 2: SRS port index(es) per each SRS port group (+ RI) + V bit resolution phase information($\theta_{i,j}'$, i=1,..., N−1, j=1,...,RI) for concatenation of port groups V can be greater than or equal to U
In this case, SRS port index(es) for all SRS port group (+RI) can be an alternative to above info.
- RI can be implicitly determined by the number of SRS ports and excluded in the feedback information.

When the above-described method of Table 1 is applied, a UE with high DVL may have a problem that the phase correction information is absent or insufficient. However, such a problem may be caused when the corresponding information could be unnecessary because the phase distortion may occur due to the hardware characteristics. Such a UE may perform transmission by generating a plurality of concatenating precoders and using them alternatively on a promised time/frequency resource basis. This will be described in detail in proposal 3. When such a method (hereinafter, this method will be referred to as concatenating precoder cycling) is applied, the BS may signal information required by the UE to apply the corresponding concatenating precoder cycling scheme. For example, information on the presence or absence of cycling, information on a range of cycling phases/magnitudes, and information on a concatenating precoder set may be included in the information required to apply the concatenating precoder cycling scheme.

Proposal 3 [Semi-open loop UL MIMO precoding] When the UE has DVL equal to or less than a specific level or is instructed by the BS to apply the following partial or concatenating precoders, the UE configures the MIMO precoder to be applied to uplink transmission as follows.

Partial precoder: The UE may determine the partial precoder based on downlink control information indicated by the BS.

Concatenating precoder:
Method 1. The UE may select a random concatenating precoder on a time/frequency resource basis or use a concatenating precoder indicated through higher layer signaling or previously scheduled as the standard.
Method 2. The UE generates a plurality of concatenating precoder sets based on concatenating precoder information, which is generated through information (e.g., downlink control information) indicated by the BS and then alternatively uses the precoder sets on a time/frequency resource basis.

Hereinafter, examples to which the proposal 3 is applied when three stages of DVL is applied will be described as follows.

TABLE 2

If UE reported DVL=HIGH, Apply Method 1
Different concatenating precoder is applied per given time/frequency resource (i,j)-th value for concatenating precoder for k-th time/frequency resource $\theta_{i,j}(k) = D_{i,j}(k)$

TABLE 2-continued

For Di,j(k), a random value is selected by the UE, or the value predetermined through higher layer signal or in the specification is used.
Ex1: The value of (360 * a natural number) is divided by the number of resources according to the number of allocated frequency resources, and then it is consistently increased depending on the resource index.
Ex2: The value of (360 * a natural number) is divided by the number of resources according to the size of allocated frequency resources, and then Di,j(k) is determined according to a specific interleaving pattern.
If UE reported DVL=MID, Apply Method2
Different concatenating precoder is applied per given time/frequency resource $\theta_{i,j}(k) = E_{i,j}(k)+$ value indicated by DCI ($\theta_{i,j}'$)
Although for Ei,j(k), a random value is selected by the UE or the value predetermined through higher layer signal or in the specification is used, the corresponding value is selected within a specific angle range.
Ex1: X degrees (where X<<180) is divided by the number of resources according to the number of allocated frequency resources, and then it is consistently increased depending on the resource index.
Ex2: X degrees (where X<<180) is divided by the number of resources according to the size of allocated frequency resources, and then Di,j(k) is determined according to a specific interleaving pattern.
If UE reported DVL=LOW
Common concatenating precoder is applied for all time/frequency resources $\theta_{i,j}(k)$ = value indicated by DCI ($\theta_{i,j}'$)

When the proposed method is applied, the number of layers to be simultaneously transmitted is determined with reference to a global precoder obtained by combining partial precoders. In addition, not only a method for transmitting demodulation RS (DM-RS) ports equivalent to the number of layers but also a method for mapping different partial precoders to different uplink DM-RS ports may be considered. In other words, although the UE transmits a DM-RS port(s) using the partial precoder per antenna group indicated by the BS, the UE may apply an open-loop precoding scheme such as a transmit diversity scheme to ports corresponding to channels such as an uplink data channel (e.g., PUSCH), an uplink control channel (e.g., PUCCH), etc.

This operation is similar to that of the 3GPP LTE system where open-loop precoding is applied using a plurality of cell-specific RS ports, but it is different in that beamforming indicated by the BS is applied to each RS port per antenna group. For example, in case of rank-1 transmission, if a UE has a total of two antenna groups, a total of two DM-RS ports are transmitted, that is, one DM-RS port per antenna group, but the Alamouti-based transmit diversity scheme is applied between the two ports. In this case, which scheme will be applied should be promised between the BS and UE because the BS needs to assume the corresponding scheme for data demodulation.

Although the above description is based on uplink transmission, the following description will be given based on downlink transmission.

Figure 8:
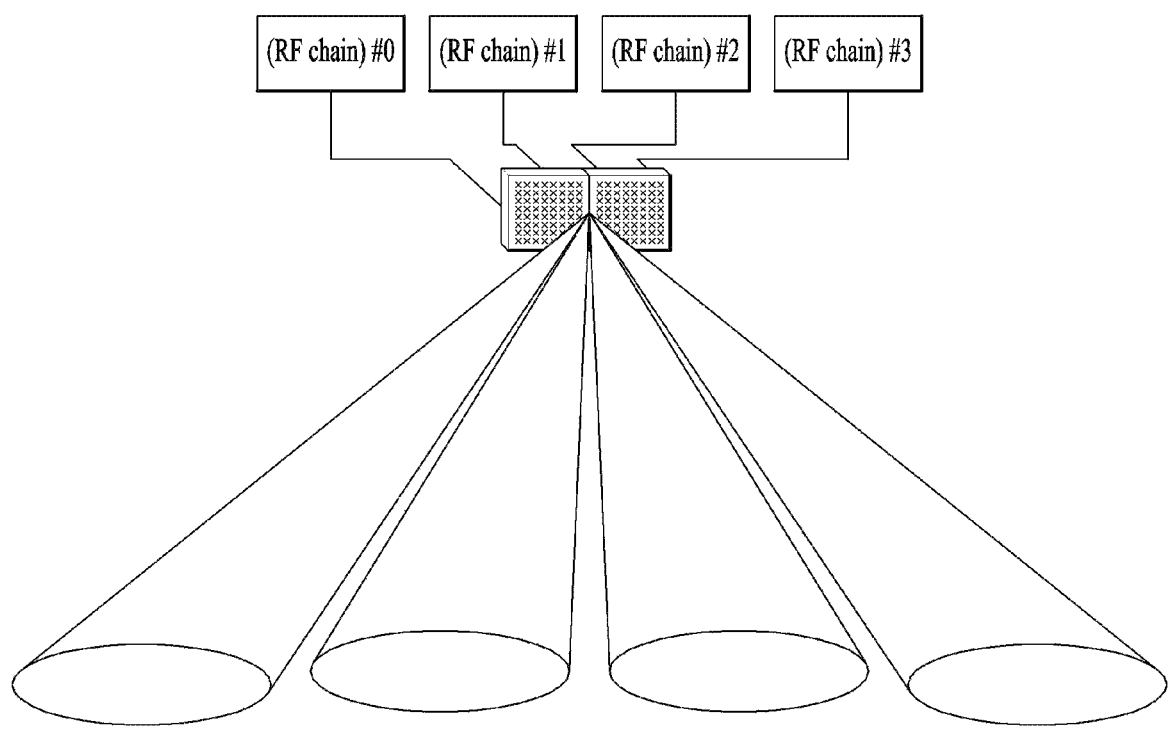
FIG. 8 is a diagram illustrating a panel and a radio frequency (RF) chain in a communication device.

FIG. 8 is a diagram illustrating a panel and a radio frequency (RF) chain in a communication device.

The communication device of FIG. 8 includes two panels, each of which has two RF chains. In this case, a total of four RF chains may be defined. FIG. 8 illustrates that analog beams having different directions are defined in each of the four RF chains. At this time, if each RF chain has a separate RF (e.g., oscillator), its phase may have the following characteristics.

If calibration is well performed between the respective RF chains, a phase difference between the RF chains is uniformly maintained (DVL=low). However, if calibration is not performed well, the phase difference may randomly vary depending on time (DVL=high).

Meanwhile, when different analog beams are received in the UE by being synthesized and a phase difference between the beams is 0, the beams are subjected to coherent combining to make sure of a high reception power. On the contrary, if the phases for the beams are opposite, the beams are subjected to destructive sum, whereby the reception power is close to 0.

Figure 9:
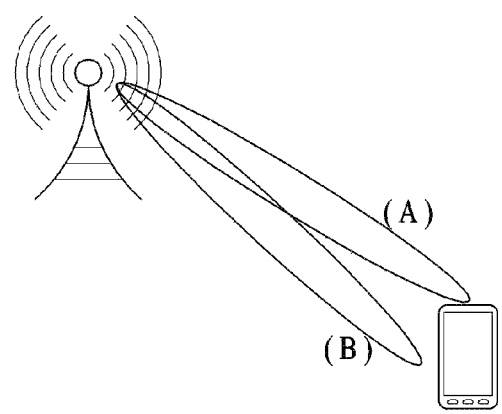
FIG. 9 is a diagram illustrating beams between a base station and a UE.

FIG. 9 is a diagram illustrating beams between a base station (BS) and a UE.

In FIG. 9, when two different beams (beam A and beam B) are synthesized with each other in the UE, the UE feeds phase information of the two beams or information on a phase difference of the two beams back to the BS. The BS may adjust a phase of each beam based on the phase information (including phase information of the two beams or information on a phase difference of the two beams) of the beams fed back from the UE such that the UE perform coherent combining.

Proposal 4: Indication as to feedback of information on phase

The BS notifies the UE of phase information (including phase information on a plurality of beams or information on a phase difference of the plurality of beams) through downlink control information (DCI) and/or RRC signaling.

The UE determines whether to feed back the phase information, based on DCI and/or RRC signaling received from the BS. Meanwhile, the proposal 4 may be upgraded as follows. The BS determines its DVL and notifies the UE of the determined DVL. If DVL is set to high (DVL=high), it is assumed that the UE does not feed the phase information back to the BS. At this time, the DVL information is cell-specific. Also, the DVL information may be transmitted through DCI and/or RRC signal.

Proposal 5: indication of the number of bits (the number of feedback bits or the number of feedback information bits) which will be used during feedback of phase information The BS notifies the UE of the number of bits, which will be used for feedback of the phase information, through DCI and/or RRC signaling. The UE may determine a phase information level, which will be fed back, based on the received information on the number of bits. The proposal 5 may be performed after the proposal 4 is defined.

Alternatively, the BS may simultaneously notify the UE whether to feed back the phase information and the number of bits of the feedback information. At this time, if the feedback is not allowed, a field indicating the number of bits of the feedback information may not be defined by the BS. If the UE determines that feedback is not allowed, it is assumed that the number of bits of the feedback information is 0.

Alternatively, the number of feedback bits may be notified regardless of the proposal 4 (the proposal 5 operates regardless of the proposal 4).

For example, if the number of panels is M, a total of M phase feedbacks are required. (Meanwhile, if a phase of one panel is assumed as a reference phase, the same throughput may be achieved only by M−1 phase feedbacks. However, for convenience of description, it is assumed that the number of panels is equal to the number of phases which will be fed back.) At this time, it is assumed that bits which will be used during the feedback indicate the number of bits of each phase. In this case, if the number of bits is N, the number of bits which will be used for a total of feedbacks, is M×N bits.

At this time, in accordance with N, the phase information level may be as follows.

1 $bit=[1\ -1]$

2 $bits=[1\ j\ -1\ -j]$

3 $bits=[1\ exp(j \times 2\ pi \times 1/8)\ exp(j \times 2\ pi \times 2/8)\ exp(j \times 2\ pi \times 3/8)\ exp(j \times 2\ pi \times 4/8)\ exp(j \times 2\ pi \times 5/8)\ exp(j \times 2\ pi \times 6/8)\ exp(j \times 2\ pi \times 7/8)]$ The above example indicates that the greater the number N of feedback bits is, the more precise phase information is. That is, in case of 1 bit, the above example may indicate 1 or −1, and in case of 2 bits, the above example may indicate one of 1, j, −1, and H.

In the above example, feedback bits indicated by uplink DCI indicate bits of each phase. However, the uplink DCI may indicate the number of a total of feedback bits instead of bits of each phase.

[DCI Format]

Based on the proposal 4 and the proposal 5, the DCI format is as follows.

[Whether a feedback is allowed, and the number of phase bits]

1 bit may be used as to whether the feedback is allowed, and the number of phase bits may have 0 to 10 bits. If a feedback grant is rejected, the number of phase bits may be 0.

2. [The number of phase bits]

Whether the feedback is allowed is not defined, and the number of phase bits is only defined. If the feedback is not requested, the number of phase bits is set to 0.

Proposal 6: Method for transmitting data in case of DVL=high

The BS transmits data using the following method in case of DVL=high.

In case of DVL=high, since a phase between RF chains of the BS continues to vary depending on time, it is difficult to expect through gain even though the UE feeds back information on a phase difference. In this case, the BS may expect throughput gain by cycling beams per resource element (RE) or RB level. The following method (method 1) indicates RE level beam cycling, and the method (method 2) indicates RB level beam cycling method.

Hereinafter, in resource grids shown in FIGS. 10 and 11, it is assumed that 1 RB includes 12 subcarriers (horizontal axis)×14 symbols (vertical axis).

Figure 10:
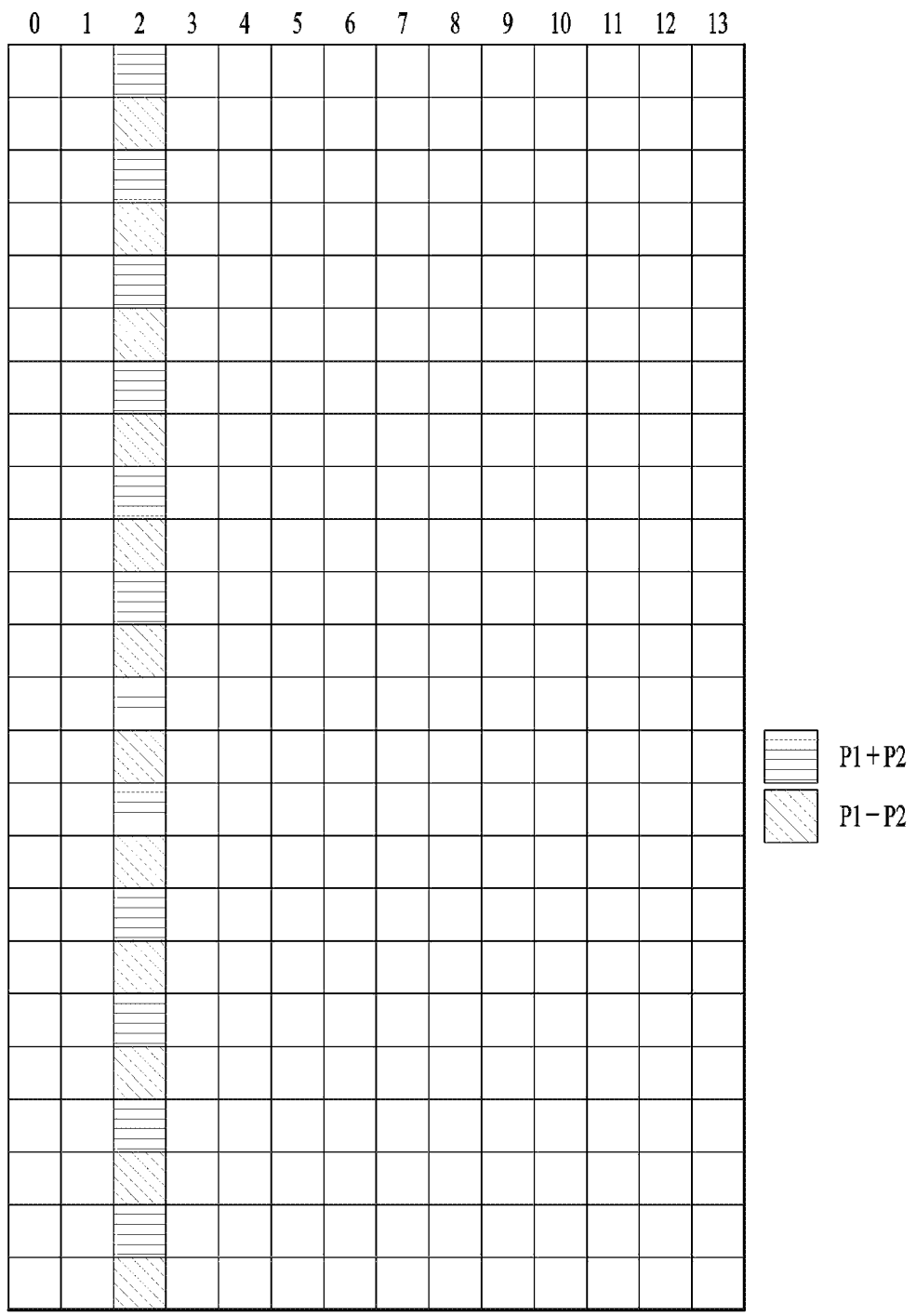
FIG. 10 is an exemplary diagram illustrating an RE level beam cycling method.

FIG. 10 is an exemplary diagram illustrating an RE level beam cycling method.

Method 1: In FIG. 10, it is assumed that the BS has one panel which has two RF chains. It is also assumed that PMIs of the respective RF chains are P1 or P2, respectively. At this time, the BS applies [1 1] and [1 −1] to RE level when transmitting two different beams generated from the two RF chains. That is, P1+P2 is defined in a first RE on a frequency axis, and P1−P2 is defined in a second RE thereon.

Figure 11:
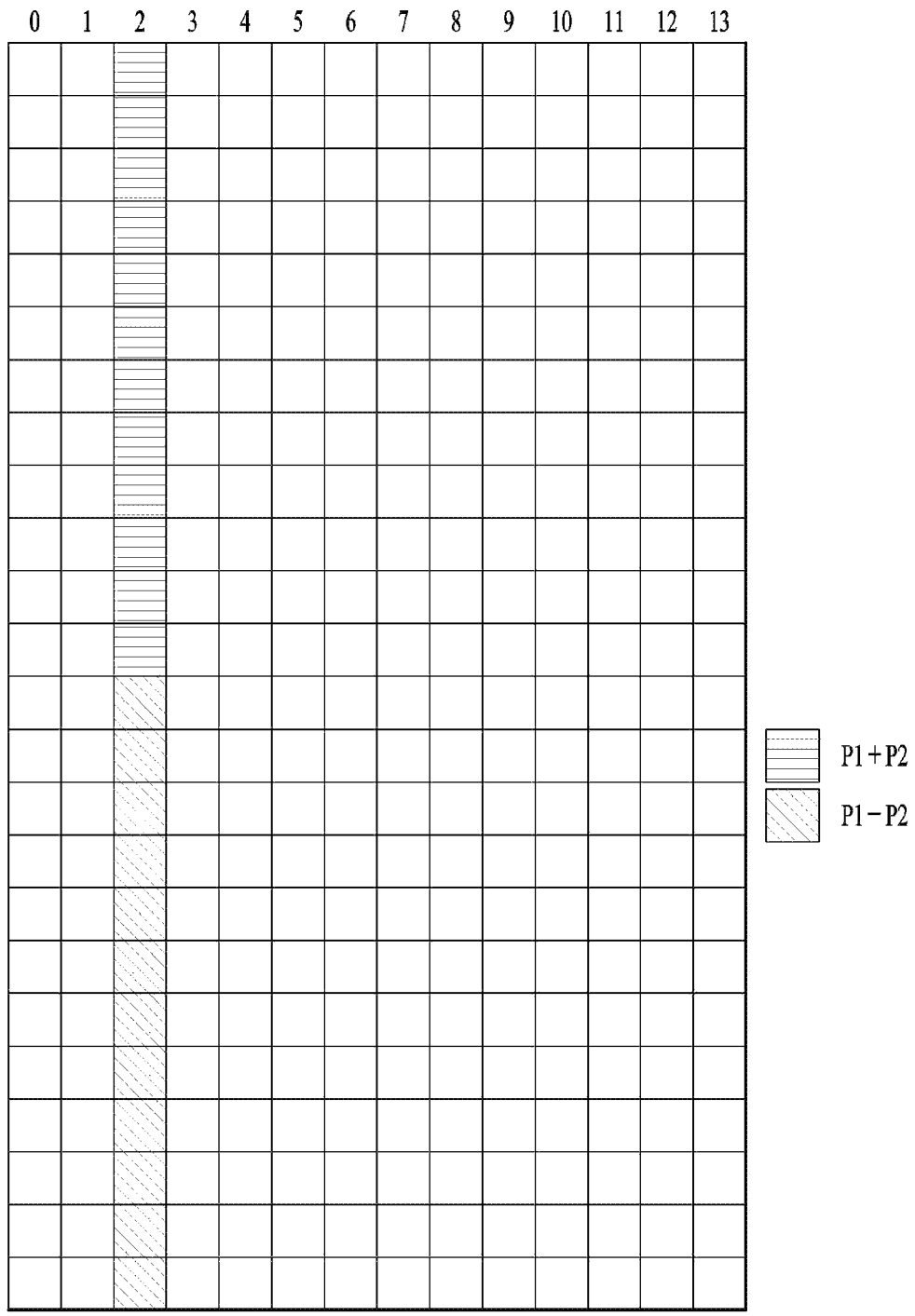
FIG. 11 is an exemplary diagram illustrating an RB level beam cycling method.

FIG. 11 is an exemplary diagram illustrating an RB level beam cycling method.

Method 2: FIG. 11 is assumed equally to the Method 1 of FIG. 10. Instead, the BS applies [1 1] and [1 −1] to RB (Resource Block) level when transmitting two different beams generated from the two RF chains. That is, P1+P2 is defined in a first RB on a frequency axis, and P1−P2 is defined in a second RE thereon.

Proposal 7: RS transmission method for CFO estimation

The BS may notify the UE of RS (Reference Signal) transmission method for CFO estimation through RRC signaling and/or DCI.

Figure 12:
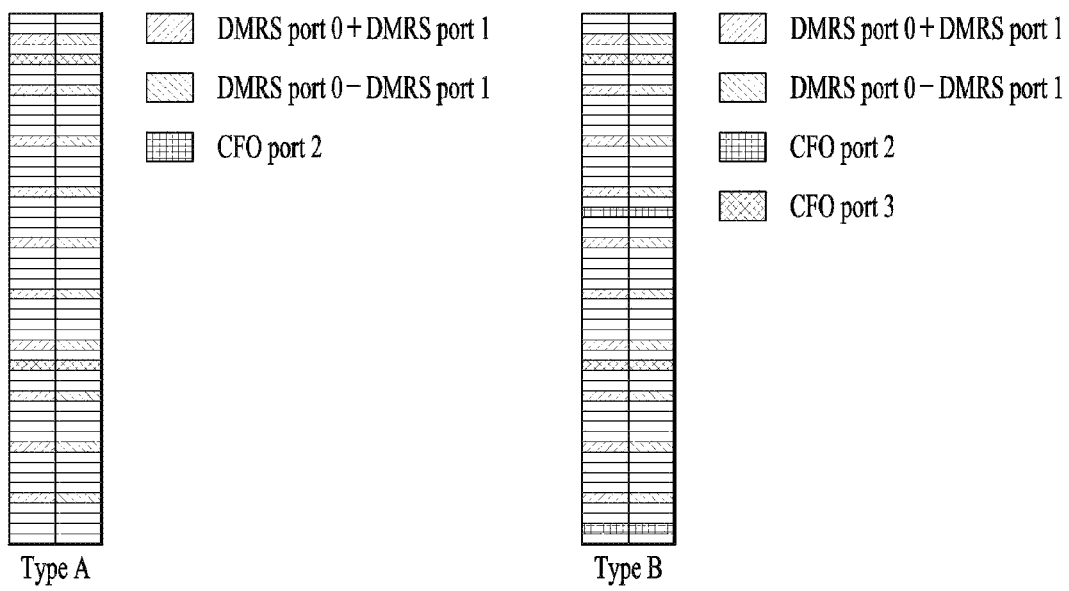
FIG. 12 is a diagram illustrating a design of a Demodulation RS (DMRS).

FIG. 12 is a diagram illustrating a design of a Demodulation RS (DMRS).

RS for CFO estimation indicates CFO port 2 or CFO port 2/3 in FIG. 12.

1. Type A

If two analog beams are transmitted from the same Transmission/Reception Point (TRP), CFO values of the beams may be similar to each other. In this case, the TRP may transmit the RS corresponding to CFO port 2 to the UE, and may signal RS transmission for the CFO port 2 to the UE. Meanwhile, if the DMRS is subjected to CDM, it is difficult to use the DMRS during CFO estimation. Therefore, a separate CFO port 2 is defined.

2. Type B

If two analog beams are transmitted from different TRPs, it is likely that CFO values of the analog beams are different from each other. In this case, TRP 1 may transmit the RS corresponding to CFO port 0 to the UE, and TRP 2 may transmit RS corresponding to CFO port 1 to the UE (TRP 1 and TRP 2 are different from each other). At this time, each TRP may notify the UE how DMRS ports 0/1 have been mapped into CFO ports 2/3, through DCI and/or RRC signaling.

Meanwhile, a mapping relation between the DMRS port and the CFO port should be notified as follows through DCI and/or RRC signaling.

The UE estimates each of CFOs of different ports by using CFO port 0 and CFO port 1. Based on this estimation, the UE estimates a channel for data detection by using DMRS port A and DMRS port B. Each of the DMRS ports 0/1 means a port for channel estimation of the two different analog beams. Since the DMRS port is transmitted by being subjected to Code Division Multiplexing (CDM), the UE may estimate the DMRS ports 0/1 in accordance with the following Equation 3.

$$DMRS\ port\ 0 = DMRS\ port\ A + DMRS\ port\ B$$

$$DMRS\ port\ 1 = DMRS\ port\ A - DMRS\ port\ B \quad [\text{Equation 3}]$$

At this time, if there is CFO (=exp(jα), exp(jB)), the Equation 3 is not established any more. Therefore, to compensate for this, the UE transmits CFO 0 RS and CFO 1 RS. In this case, CFO 0 is used to estimate exp(jα), and CFO 1 is used to estimate exp(jB).

If a receiving side know these two values exp(jα) and exp(jB), the receiving side re-defines the DMRS port 0 and the DMRS port 1 as expressed by the following Equation 4.

$$DMRS\ port\ 0 = (DMRS\ port\ A + exp(jB) \times DMRS\ port\ B)/(exp(j\alpha) + exp(j2\alpha - jB))$$

$$DMRS\ port\ 1 = (DMRS\ port\ A - exp(-j\alpha) \times DMRS\ port\ B)/(exp(jB) - exp(j2B - j\alpha)) \quad [\text{Equation 4}]$$

At this time, if the BS does not notify a mapping relation between the DMRS port and the CFO port, the Equation 4 cannot be applied.

It is defined that each panel or RF chain within each panel has each PMI and phase. However, some of the panels or RF chains may be virtualized to define a virtual panel or a virtual RF chain. In this case, the PMI and the phase may be re-defined to be matched with the virtual panel or the virtual RF chain.

Meanwhile, phase information of the BS may be configured UE-commonly. In this case, the BS may select a specific UE such that the phase information may be fed back from the specific UE in accordance with the proposal 4 and the proposal 5. Also, the BS may support other UEs based on the phase information. Meanwhile, the panel may be replaced with an antenna array or antenna group.

As described above, the present invention defines signaling for a feedback of phase information of each panel from a UE and a UE behavior when a BS having a plurality of antenna arrays/panels/groups performs downlink transmission.

The various proposals have been described as above, and although the proposals have been described respectively for convenience of description, these proposals may be carried out in combination.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for signaling for a phase feedback and the device for the same are industrially applicable to various wireless communication systems such as 3GPP LTE/LTE-A and 5G system.

The invention claimed is:

1. A method for receiving signaling for a phase feedback by a User Equipment (UE), the method comprising:
   receiving, from a base station (BS), control information including first information indicating whether the UE should perform the phase feedback for a plurality of beams;
   determining whether to perform the phase feedback based on the control information; and
   receiving, from the BS, a downlink channel based on performing beam cycling in a unit of a resource element (RE), based on the first information indicating that the phase feedback should not be performed,
   wherein first REs to which a first beam is applied and second REs to which a second beam is applied are configured to be interlaced within one symbol based on performing the beam cycling, and
   wherein the first beam and the second beam are differently configured based on a different combination of precoding matrix indices used for reception of the downlink channel.

2. The method of claim 1, wherein the first information indicates that the phase feedback should not be performed when the first information is greater than a threshold value previously defined for a phase distortion level between antenna groups of the BS.

3. The method of claim 1, wherein the first information indicates that the phase feedback should be performed when the first information is less than a threshold value previously defined for a phase distortion level between antenna groups of the BS.

4. The method of claim 1, wherein the control information further includes second information indicating a precoder scheme for downlink reception of the UE based on the first information indicating that the phase feedback should not be performed.

5. The method of claim 1, wherein the control information further includes second information for a phase information feedback of the UE based on the first information indicating that the phase feedback should be performed.

6. The method of claim 5, further comprising:
transmitting information on the phase feedback based on the control information.

7. The method of claim 5, wherein the control information further includes information on a number of bits which will be used for the phase feedback.

8. The method of claim 7, further comprising:
determining a level of phase information for the phase feedback based on the number of bits which will be used for the phase feedback.

9. A User Equipment (UE) receiving signaling for a phase feedback, the UE comprising:
a receiver configured to receive, from a base station (BS), control information including first information indicating whether the UE should perform the phase feedback for a plurality of beams;
a processor configured to determine whether to perform the phase feedback on the basis of the control information; and
the receiver configured to receive, from the BS, a downlink channel based on performing beam cycling in a unit of a resource element (RE), based on the first information indicating that the phase feedback should not be performed,
wherein first REs to which a first beam is applied and second REs to which a second beam is applied are configured to be interlaced within one symbol based on performing the beam cycling, and
wherein the first beam and the second beam are differently configured based on a different combination of precoding matrix indices used for reception of the downlink channel.

10. The UE of claim 9, wherein the first information indicates that the phase feedback should not be performed when the first information is greater than a threshold value previously defined for a phase distortion level between antenna groups of the BS.

11. The UE of claim 9, wherein the first information indicates that the phase feedback should be performed when the first information is less than a threshold value previously defined for a phase distortion level between antenna groups of the BS.

12. The UE of claim 9, wherein the control information further includes second information indicating a precoder scheme for downlink reception of the UE based on the first information indicating that the phase feedback should not be performed.

13. The UE of claim 11, wherein the control information further includes second information for a phase information feedback of the UE [when] based on the first information indicating that the phase feedback should be performed.

14. The UE of claim 12, wherein the control information further includes information on a number of bits which will be used for the phase feedback.

15. The UE of claim 14, wherein the processor is further configured to determine a level of phase information for the phase feedback based on the number of bits which will be used for the phase feedback.

16. A method for transmitting signaling for a phase feedback by a based station (BS), the method comprising:
transmitting, to a user equipment (UE), control information including first information indicating whether the UE should perform the phase feedback for a plurality of beams; and
transmitting, to the UE, a downlink channel based on performing beam cycling in a unit of a resource element (RE), and based on the first information indicating that the phase feedback should not be performed,
wherein first REs to which a first beam is applied and second REs to which a second beam is applied are configured to be interlaced within one symbol based on performing the beam cycling, and
wherein the first beam and the second beam are differently configured based on a different combination of precoding matrix indices used for reception of the downlink channel.

17. A base station (BS) transmitting signaling for a phase feedback, the base station comprising:
a transmitter; and
a processor,
wherein the processor controls the transmitter to transmit, to a user equipment (UE), control information including first information indicating whether the UE should perform the phase feedback for a plurality of beams, and controls the transmitter to transmit, to the UE, a downlink channel based on performing beam cycling in a unit of a resource element (RE), and based on the first information indicating that the phase feedback should not be performed,
wherein first REs to which a first beam is applied and second REs to which a second beam is applied are configured to be interlaced within one symbol based on performing the beam cycling, and
wherein the first beam and the second beam are differently configured based on a different combination of precoding matrix indices used for reception of the downlink channel.

* * * * *